March 19, 1929.  E. H. LICHTENBERG  1,705,578
ADJUSTABLE GAUGE MULTIPLANE
Filed Oct. 12, 1926  2 Sheets-Sheet 1
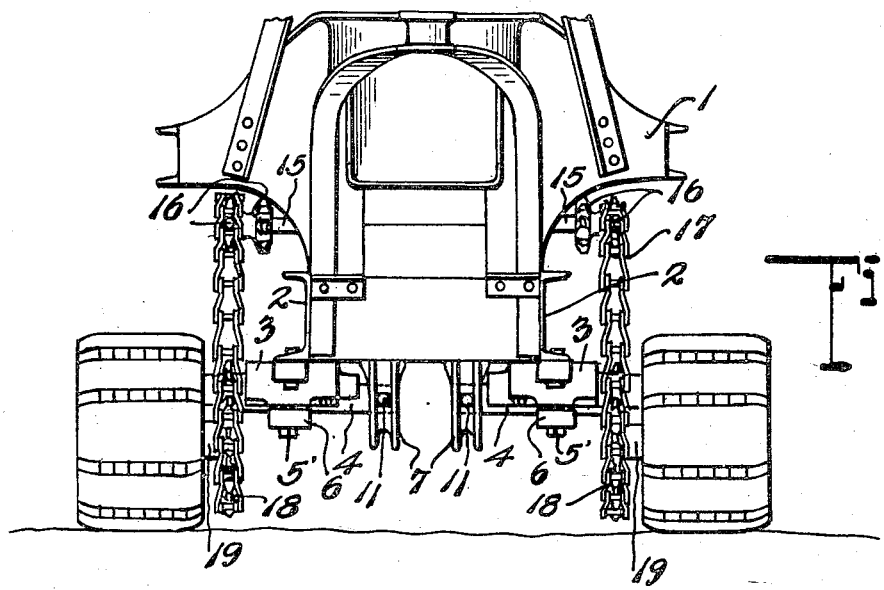
Fig.1.
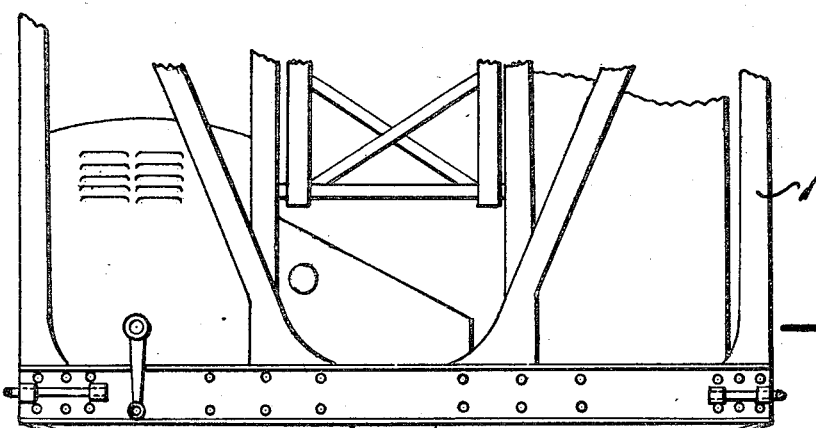
Fig.2.
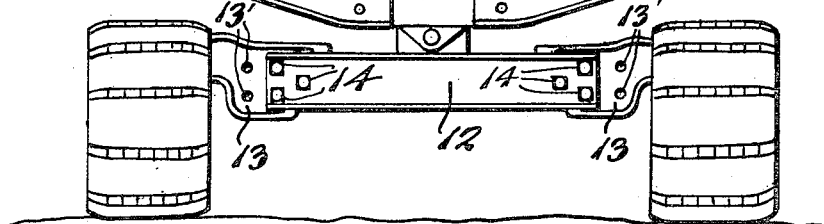
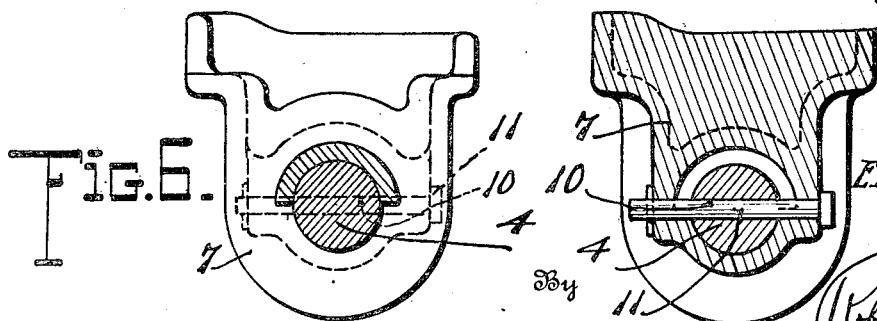
Fig.6. Fig.7.
Inventor
E. H. Lichtenberg
By Robb, Robb & Hill
Attorneys.

March 19, 1929.　　E. H. LICHTENBERG　　1,705,578
ADJUSTABLE GAUGE MULTIPLANE
Filed Oct. 12, 1926　　2 Sheets-Sheet 2
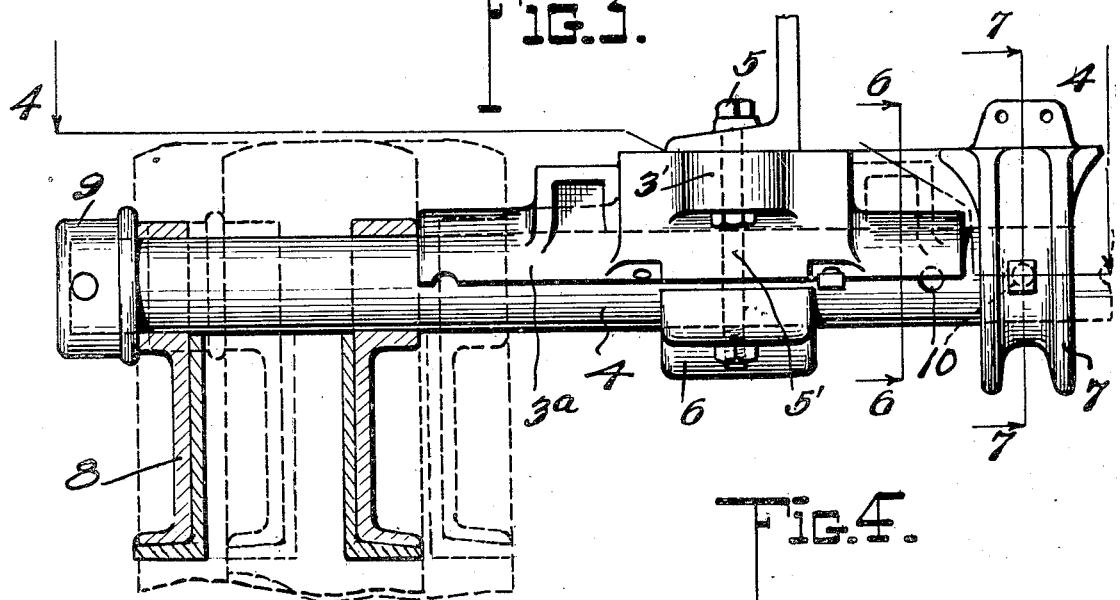
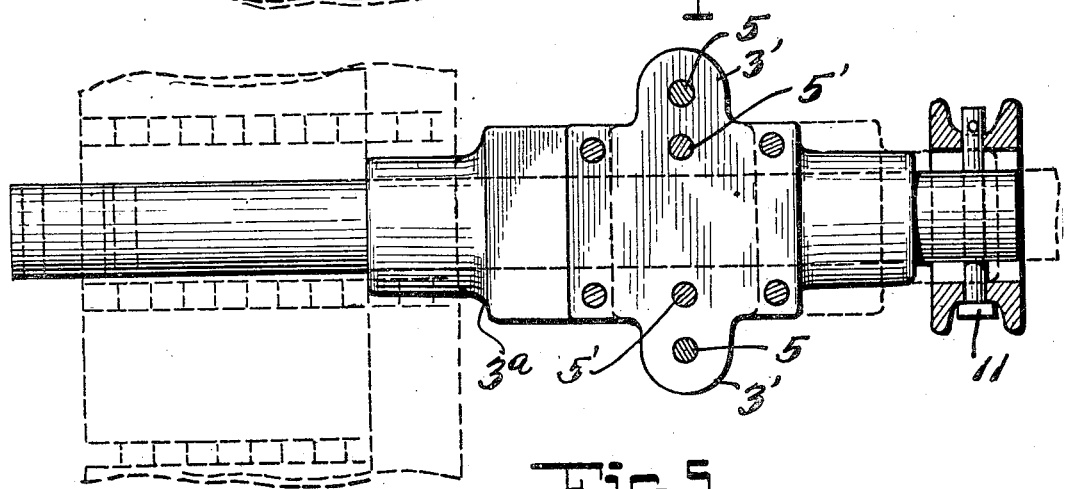
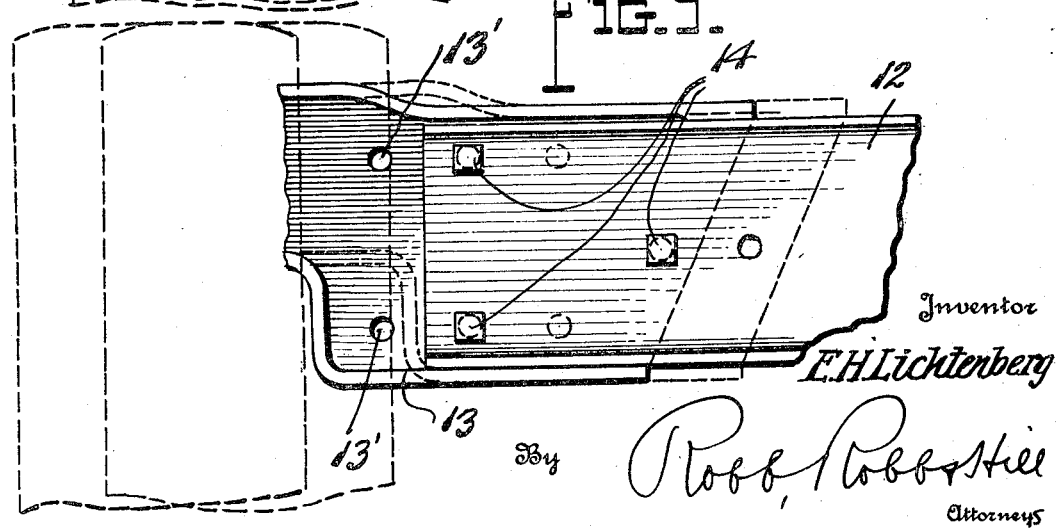
Inventor
E. H. Lichtenberg
By Robb, Robb & Hill
Attorneys Patented Mar. 19, 1929.

1,705,578

UNITED STATES PATENT OFFICE.

ERICH H. LICHTENBERG, OF MILWAUKEE, WISCONSIN, ASSIGNOR TO KOEHRING COMPANY, OF MILWAUKEE, WISCONSIN, A CORPORATION.

ADJUSTABLE GAUGE MULTIPLANE.

Application filed October 12, 1926. Serial No. 141,192.

The present invention appertains to improvements in mountings for traction devices of pavers, mixers and similar apparatus by means of which the gauge may be narrowed or widened to more readily answer the problems of special road conditions met with in the use of these machines.

It is of course generally appreciated that a wide gauge support conduces to greater stability in cumbersome apparatus of the aforesaid types having heavy superstructures, in so far as general transportation is concerned, but such wide gauge presents an operating problem in half-width road construction, for example, of no little moment.

To overcome this and other difficulties, the present invention has for its object to provide an adjustable traction support embodying multiplane units arranged in spaced relation and so connected as to enable the connections to be readily adjusted as to length, whereby the gauge of the multiplanes may be varied according to existing demands.

Other objects and advantages of the invention will be hereinafter set forth and the novel features thereof defined by the appended claims.

In the accompanying drawing:

Figure 1 is a view in elevation of the rear end of a machine of the paver type equipped with my special adjustable gauge support;

Figure 2 is a fragmentary front elevation of the machine;

Figure 3 is an enlarged detail view of one section of the rear support for the body of the machine;

Figure 4 is a horizontal sectional view taken about on the plane indicated by the line 4—4 of Figure 3;

Figure 5 is an enlarged detailed view of the adjustable connection for the front axle support; and Figures 6 and 7 are transverse sectional views on the lines 6—6 and 7—7 of Figure 3.

Like reference numerals designate corresponding parts throughout the several figures of the drawing.

Referring to the drawing, 1 designates the main frame of a mixer, a paver or other conventional apparatus of this type which includes the longitudinal channel beams 2. As shown in Figure 1 of the drawings these beams are supported at the rear of the machine upon blocks or brackets 3 which rest upon the axles 4 and are clamped thereto by means of the bolts 5—5' and the clamping plates 6. Each of the axles 4 has a bearing at its inner end in the depending bracket 7 fixed to the frame of the machine and at its outer end in the girder member 8 of a multiplane unit. As the outer extremity of each axle or shaft 4 a cap 9 is removably secured and, as best seen in Figure 3, said cap coacts with the girder at the outer side thereof while the outer end of the supporting bracket 3 abuts the girder at its inner side. Each shaft furthermore is provided with a pair of spaced openings through which a pin 11 is adapted to be passed to secure the end of the shaft to the bearing bracket 7 with which it co-operates. The pin 11 is passed through the extreme opening 10 when the multiplane is adjusted to its extended position or wide gauge and through the adjacent opening 10 when adjusted to the narrow gauge.

The supporting brackets 3 are of special construction by reason of the necessity to reverse their position when the change from narrow to wide gauge is made and vice versa. Owing to the fact that said brackets are identical in form and construction, only one will be described in detail. To one side of the center of the length dimension of the bracket there is provided a pair of corresponding laterally extending lugs 3' through which the clamping bolts 5 pass. The base of the bracket is concaved to conform to the shape of the shaft 4 upon which it rests. It is furthermore provided with a relatively long spacing extension 3$^a$ at one end and a relatively short spacing extension 3$^b$ at its other end. In this form of construction it will be apparent that the end of the extension 3$^a$ coacts with the girder member of the multiplane unit when adjusted to the wide gauge and the extension 3$^b$ coacts with said girder when the adjustment is made to the narrow gauge, these two positions being shown in full and dotted lines, respectively, in Figures 3 and 4 of the drawings. When adjusted to the narrow gauge, the end of the extension 3$^a$ projects into the bearing bracket 7 which is cut out to accomodate this extremity.

In the change of the gauge of the multiplane unit, speaking with reference to the rear end of the machine, it will be understood that it will be necessary only to jack up the frame and remove the clamping bolts 5 and 5' as well as the connecting pins 11.

The shafts 4 are then shifted inwardly and the brackets 3 are reversed in their position, as hereinbefore premised, the pins 11 being passed through the inner openings 10 while the clamping bolts 5 and 5' are replaced.

With regard to the front end of the machine, it will be noted that the frame of the machine is carried by the central axle section 12 which is adjustably connected to the spindle sections 13 each of which has a bearing in the front portion of its associated multiplane girder. The spindle sections are provided with a series of openings 13' to receive the bolts 14 and the adjustment of the gauge of the supporting unit at the front portion of the machine simply requires the displacement of the bolts 14 from the position shown in Figure 2 and replacement in the extra openings provided for the narrow gauge position.

In the type of apparatus to which the present invention is shown applied, a drive shaft 15 is carried by the frame and driven from a suitable source of power, not shown. This shaft has attached thereto at each end a pair of small sprockets 16 to receive the driving chains 17 which pass around large sprockets 18 carried by the ends of the driving shafts 19 for the multiplane units. A shown in Figure 1, when the machine is adjusted for the wide gauge the chain is applied to the outer of the small sprockets 16, while when adjusted for the narrow gauge the chain is shifted onto the inner of the small sprockets 16 upon the drive shaft 15.

It will be obvious from the foregoing description that the traction device which forms the subject matter of this invention constitutes an adjustable unit upon which any type of operating apparatus may be mounted, and that it comprises the independent multiplane units which may be adjusted with reference to their connecting elements so as to vary the gauge from a standard gauge, for example of ninety inches, to a narrow gauge, for example of eighty-two inches. Obviously other adjustments may be provided if desired and I therefore do not wish to limit myself as to the dimensions of the gauges obtainable by a construction such as disclosed hereinbefore.

Having thus described my invention, what I claim as new and desire to secure by Letters Patent is:

1. A traction support for machines of the class described comprising a pair of traction devices, axle members having bearings in a relatively fixed member of said devices at their outer ends, frame supports including reversible members engaging said bearings and adjustably receiving the inner ends of said axle members whereby said axles may be shifted inwardly and outwardly of said supports, and means for locking the axles in their adjusted positions.

2. In a traction supporting unit for machines of the class described, the combination of a body frame, a pair of multiplane units, axle supports having bearings in said multiplane units, and a reversible frame bracket mounted on each of said axle supports intermediate the units and frame and secured to the latter, said frame brackets having projecting portions varying in length at the ends thereof, positionable between the multiplane units.

3. In a traction supporting unit for machines of the class described, the combination of a frame, a pair of multiplane units, rear axle supports connected with the multiplane units and with the frame, supporting brackets carried by said frame and mounted upon said axle supports intermediate said units and frame and in one position when the multiplane is adjusted for one gauge, said bracket supports being shiftable into another position when the multiplanes are adjusted for a different gauge, and driving means co-acting with said multiplanes.

4. In adjustable gauge multiplane supports for machines of the class described, the combination of a body frame, a pair of multiplane units, rear axle shafts having a fixed connection with the frame at one end and a bearing in the multiplane unit at the other end, reversible brackets coacting with said axle shafts and means for clamping said brackets to the frame and axle shafts, a driving shaft mounted on said frame and having spaced driving members thereon, and a front axle support having means for adjusting the length dimension thereof.

In testimony whereof I affix my signature.

ERICH H. LICHTENBERG.